United States Patent
Ho et al.

(10) Patent No.: US 9,955,447 B2
(45) Date of Patent: Apr. 24, 2018

(54) CLOCK SYNCHRONIZATION METHOD, MOBILE NETWORK SYSTEM, NETWORK CONTROLLER AND NETWORK SWITCH

(71) Applicant: Industrial Technology Research Institute, Hsinchu (TW)

(72) Inventors: Cheng-You Ho, Changhua County (TW); Tain-Lieng Kao, Tainan (TW)

(73) Assignee: Industrial Technology Reseearch Institute, Hsinchu (TW)

( * ) Notice: Subject to any disclaimer, the term of this patent is extended or adjusted under 35 U.S.C. 154(b) by 268 days.

(21) Appl. No.: 15/075,209

(22) Filed: Mar. 21, 2016

(65) Prior Publication Data

US 2017/0257836 A1 Sep. 7, 2017

(30) Foreign Application Priority Data

Mar. 1, 2016 (TW) .............................. 105106093 A

(51) Int. Cl.
*H04W 56/00* (2009.01)
*H04W 24/00* (2009.01)
(Continued)

(52) U.S. Cl.
CPC ......... *H04W 56/009* (2013.01); *H04L 7/0004* (2013.01); *H04L 43/0864* (2013.01); *H04W 56/0015* (2013.01)

(58) Field of Classification Search
CPC ........... H04W 56/009; H04W 56/0015; H04W 80/04; H04W 72/04; H04L 7/00;
(Continued)

(56) References Cited

U.S. PATENT DOCUMENTS

| 8,982,776 | B1 | 3/2015 | Pearson et al. | |
|---|---|---|---|---|
| 2007/0097865 | A1* | 5/2007 | Song ....................... | H04J 3/247 370/235 |

(Continued)

FOREIGN PATENT DOCUMENTS

| CN | 103516508 | 1/2014 |
|---|---|---|
| CN | 104348568 | 2/2015 |

(Continued)

OTHER PUBLICATIONS

Tal Mizrahi, et al., "Using REVERSEPTP to Distribute Time in Software Defined Networks," 2014 IEEE International Symposium on Precision Clock Synchronization for Measurement, Control, and Communication (ISPCS), Sep. 22-26, 2014, pp. 112-117.

(Continued)

Primary Examiner — Andrew Lee
(74) Attorney, Agent, or Firm — JCIPRNET

(57) ABSTRACT

A clock synchronization method, a mobile network system, a network controller and a network switch are provided. The method computes a round-trip delay ratio between the network controller and the network switch according to a first delay, of which the network controller transmits a packet to the network switch, and a second delay, of which the network switch transmits another packet to the network controller. The method also locks a first clock based on a time-transfer protocol with the round-trip delay ratio, wherein the first clock is synchronized with a master clock of the network controller. The method further sets the first clock being locked as a runtime clock of the network switch.

44 Claims, 12 Drawing Sheets

(51) Int. Cl.
H04J 3/06 (2006.01)
H04L 7/00 (2006.01)
H04L 12/26 (2006.01)

(58) Field of Classification Search
CPC ... H04L 12/26; H04L 56/009; H04L 43/0864; H04L 47/10; H04L 43/50; H04J 3/06
See application file for complete search history.

(56) References Cited

U.S. PATENT DOCUMENTS

| | | | |
|---|---|---|---|
| 2008/0212480 A1* | 9/2008 | Shimonishi | H04L 1/187 370/236 |
| 2010/0172453 A1 | 7/2010 | Cankaya et al. | |
| 2012/0191878 A1* | 7/2012 | Yoshida | H04J 3/0638 709/248 |
| 2013/0170388 A1* | 7/2013 | Ito | H04J 3/0667 370/252 |
| 2014/0219651 A1* | 8/2014 | Ruffini | H04J 14/02 398/33 |
| 2015/0242144 A1* | 8/2015 | Saito | G06F 3/0611 711/162 |
| 2017/0195980 A1* | 7/2017 | Aggarwal | H04W 56/007 |
| 2017/0201435 A1* | 7/2017 | Tan | H04L 43/08 |
| 2017/0332279 A1* | 11/2017 | Kobayashi | H04W 28/16 |

FOREIGN PATENT DOCUMENTS

| | | |
|---|---|---|
| CN | 104410170 | 3/2015 |
| CN | 104486159 | 4/2015 |
| EP | 2750339 | 7/2014 |
| TW | 201524155 | 6/2015 |

OTHER PUBLICATIONS

Tal Mizrahi, et al., "ReversePTP: A Software Defined Networking Approach to Clock Synchronization," HotSDN 14 Proceedings of the third workshop on Hot topics in software defined networking, Aug. 22, 2014, pp. 203-204.

Tal Mizrahi, et al., "Time-based Updates in OpenFlow: A Proposed Extension to the OpenFlow Protocol," CCIT Report #835, Jul. 2013, EE Pub No. 1792, Technion, Israel. pp. 1-11.

Michel Ouellette, et al., "Using IEEE 1588 and Boundary Clocks for Clock Synchronization in Telecom Networks," IEEE Communications Magazine, vol. 49, Issue 2, Feb. 2011, pp. 164-171.

Raúl Suárez, et al., "Extending OpenFlow for SDN-enabled Synchronous Ethernet networks," 2015 1st IEEE Conference on Network Softwarization (NetSoft), Apr. 13-17, 2015, pp. 1-6.

Zdenek Chaloupka, et al., "Transparent Clock Characterization Using IEEE 1588 PTP Timestamping Probe," 2015 IEEE International Instrumentation and Measurement Technology Conference (I2MTC), May 11-14, 2015, pp. 1537-1542.

Hyungbae Park, et al., "Toward Control Path High Availability for Software-Defined Networks," 2015 11th International Conference on the Design of Reliable Communication Networks (DRCN), Mar. 24-27, 2015, pp. 165-172.

"Office Action of Taiwan Counterpart Application," dated Jul. 26, 2017, p. 1-p. 10.

* cited by examiner

CLOCK SYNCHRONIZATION METHOD, MOBILE NETWORK SYSTEM, NETWORK CONTROLLER AND NETWORK SWITCH

CROSS-REFERENCE TO RELATED APPLICATION

This application claims the priority benefit of Taiwan application serial no. 105106093, filed on Mar. 1, 2016. The entirety of the above-mentioned patent application is hereby incorporated by reference herein and made a part of this specification.

BACKGROUND OF THE DISCLOSURE

Field of the Disclosure

The disclosure relates to a clock synchronization method and a mobile network system, a network controller, and a network switch.

Description of Related Art

Along with the continued development of fourth generation (4G) long term evolution (LTE) technology, base station (BS) clock synchronization is a required feature due to the technical requirement of LTE time division duplex (LTE-TDD) and the technologies of the enhanced Inter-cell Interference Coordination (eICIC) in third generation partnership project (3GPP) Release-10. However, the clock synchronization technology of Backhaul Network is becoming more important because of the increase in the number of BSs and the difficulty for obtaining the provisioning locations of GPS antennas. The techniques of clock synchronization in a network may be, for example, Network Timing Protocol (NTP), Synchronous Ethernet and IEEE 1588v2 Precision Time Protocol (PTP). Wherein, the IEEE 1588v2 PTP provides frequency and time synchronization at the same time and has a sub-microsecond or higher accuracy, therefore the IEEE 1588v2 PTP is currently the most important clock synchronization technology in mobile network.

Precision Time Protocol (PTP), as defined in the IEEE 1588v2 (i.e., IEEE-1588-2008) standard entitled "Standard for a Precision Clock Synchronization Protocol for Networked Measurement and Control Systems," enables precise synchronization of clocks over a data packet network. In a nutshell, PTP is used to distribute a "grandmaster" clock's precise time-of-day to slave clocks. This is done using an exchange of PTP packets, which include timestamps carried inside. Slave clocks adjust these timestamps to account for end-to-end delay, and can obtain a local time-of-day (TOD) aligned to the grandmaster with sub-microsecond precision, in some cases.

While PTP messages are generally sent using multicast messaging, IEEE 1588v2 includes specifications to allow a master clock to negotiate unicast transmission on a port-by-port basis. PTP messages used by ordinary and boundary clocks include Sync, Delay_Req, Follow_Up and Delay_Resp messages, which are used to transfer time-related information across the network. Additional message types are used by so-called "transparent clocks," to measure delays across the network for improved correction of transferred TOD. These include Pdelay_Req and Pdelay_Resp messages.

The clock synchronization technology of the IEEE 1588v2 PTP is a master-slave protocol. In the process of switching multiple packets between a master device and a slave device, the slave device can calculate and obtain the transmission delay time (Delay) and the time offset (Offset) from the master device, then correct the clock of the slave device to synchronize with the master device. However, the accuracy of the IEEE 1588v2 PTP depends on two factors. The first factor is the symmetry of the network path, wherein when the routing path from the master device to the slave device and the routing path from the slave device to the master device are asymmetry, calculating the delay time will cause an error. The second factor is the delay variation of packets transmission (that is, the transmission delay time is unstable). The unstable transmission delay time will cause difficult computations of the time offset, therefore the accuracy of synchronization protocol will be reduced.

FIG. 1A is a schematic diagram illustrating a clock synchronization architecture in an existing mobile network. Referring to FIG. 1A, the clock synchronization architecture in the existing mobile network, an operator sets a Grandmaster clock as a master clock in the entire network. The master clock transmits the synchronous message from the network switch to the BS in a stepwise fashion by a boundary clock (BC) and a transparent clock (TC), thus the BS synchronizes with the Grandmaster clock. However, operators in actually deploying the mobile network may face two challenges of clock synchronization issues.

FIG. 1B is a schematic diagram illustrating a clock synchronization architecture may face the challenges in the existing mobile network. Referring to FIG. 1B, the clock synchronization of deploying the mobile network, the first challenge of the clock synchronization issues is that the backhaul network may have excessive network switches for transmitting a synchronous message, or the backhaul network may exist third-party untrusted networks. In this case, it may cause the significant delay variation for transmitting the clock synchronous message because of factors such as the clock synchronous message transmission may not be guaranteed or the third-party untrusted networks may not support an IEEE 1588v2 PTP. Therefore, it will affect the synchronous operation between the Grandmaster clock and the BS. In addition, the second challenge of the clock synchronization issues is, when the well-established mobile network and the Grandmaster clock cannot synchronize with the BS, operators are difficult to detect this condition which is caused by the network switch. The operators must spend more manpower and time to detect the network switches one by one to find out which network switch breaks down, thus resulting in a substantial decrease in the service quality and increasing operating costs.

SUMMARY OF THE DISCLOSURE

The disclosure is provided a method for clock synchronization, and a system for mobile network, a network controller and a network switch, by which the clock synchronization accuracy is effectively improved, the delay variation is effectively reduced, and having a fault detection function.

An exemplary embodiment of the disclosure provides a clock synchronization method for a centralized mobile network, the clock synchronization method includes computing a round-trip delay ratio between a network controller and a network switch according to a first delay, of which the network controller transmitting a packet to the network switch, and a second delay, of which the network switch transmitting another packet to the network controller. The method also includes locking a first clock based on a time-transfer protocol with the round-trip delay ratio, wherein the first clock is synchronized with a master clock of the network controller. The method further includes setting the first clock being locked as a runtime clock of the network switch.

An exemplary embodiment of the disclosure provides a mobile network system including a network controller and a network switch. The network controller computes a round-trip delay ratio between the network controller and the network switch according to a first delay, of which the network controller transmits a packet to the network switch, and a second delay, of which the network controller transmits a packet to the network switch, and a second delay, of which the network switch transmits another packet to the network controller. The network switch locks a first clock based on a time-transfer protocol with the round-trip delay ratio, wherein the first clock is synchronized with a master clock of the network controller. The network switch further sets the first clock being locked as a runtime clock of the network switch.

An exemplary embodiment of the disclosure provides a network controller, adapted to a centralized mobile network including a timing module and a clock synchronous calculation module. The timing module synchronizes a clock of the network controller with a Grandmaster clock, obtaining the clock synchronized with the Grandmaster clock as a master clock of the network controller. The clock synchronous calculation module computes a round-trip delay ratio between the network controller and a network switch according to a first delay, of which the network controller transmits a packet to the network switch, and a second delay, of which the network switch transmits another packet to the network controller.

An exemplary embodiment of the disclosure provides a network switch, adapted to a centralized mobile network including a slave clock operation module and a timing module. The slave clock operation module receives a round-trip delay ratio from a network controller in the centralized mobile network, wherein the round-trip delay ratio is computed according to a first delay, of which the network controller transmits a packet to the network switch, and a second delay, of which the network switch transmits another packet to the network controller. The timing module locks a first clock based on a time-transfer protocol with the round-trip delay ratio, wherein the first clock is synchronized with a master clock of the network controller. Wherein the slave clock operation module sets the first clock being locked as a runtime clock of the network switch.

According to the above descriptions, in the clock synchronization method, the mobile network system, the network controller and the network switch provided by the exemplary embodiments of the disclosure, running a clock locking adjustment procedure may effectively improve the clock synchronization accuracy based on the time-transfer protocol with the round-trip delay ratio, effectively reduce the delay variation, and have a fault detection function.

The foregoing will become better understood from a careful reading of a detailed description provided herein below with appropriate reference to the accompanying drawings.

DESCRIPTION OF EMBODIMENTS

An exemplary embodiment of the disclosure provides a clock synchronization method for a network controller calculating a round-trip delay ratio between the network controller and the network switch. The network switch performs the clock locking adjustment procedure based on the time-transfer protocol with the round-trip delay ratio and sets the clock being locked as a runtime clock of the network switch. Based on this, the clock synchronization accuracy may be effectively improved.

In some embodiments, the time-transfer protocol is compliant with the Precision Clock Synchronization Protocol specified by the Precision Time Protocol (PTP) of IEEE Standard 1588-2008.

For purposes of illustration and explanation only, several embodiments of the present disclosure are described herein in the backhaul network that uses the PTP. The PTP was originally defined in the IEEE 1588v2 standard. It will be understood, however, that the present disclosure is not limited to such embodiments and may be implemented in connection with other time-transfer protocols, whether those protocols are related to the IEEE 1588v2 standard or not.

Figure 1A:
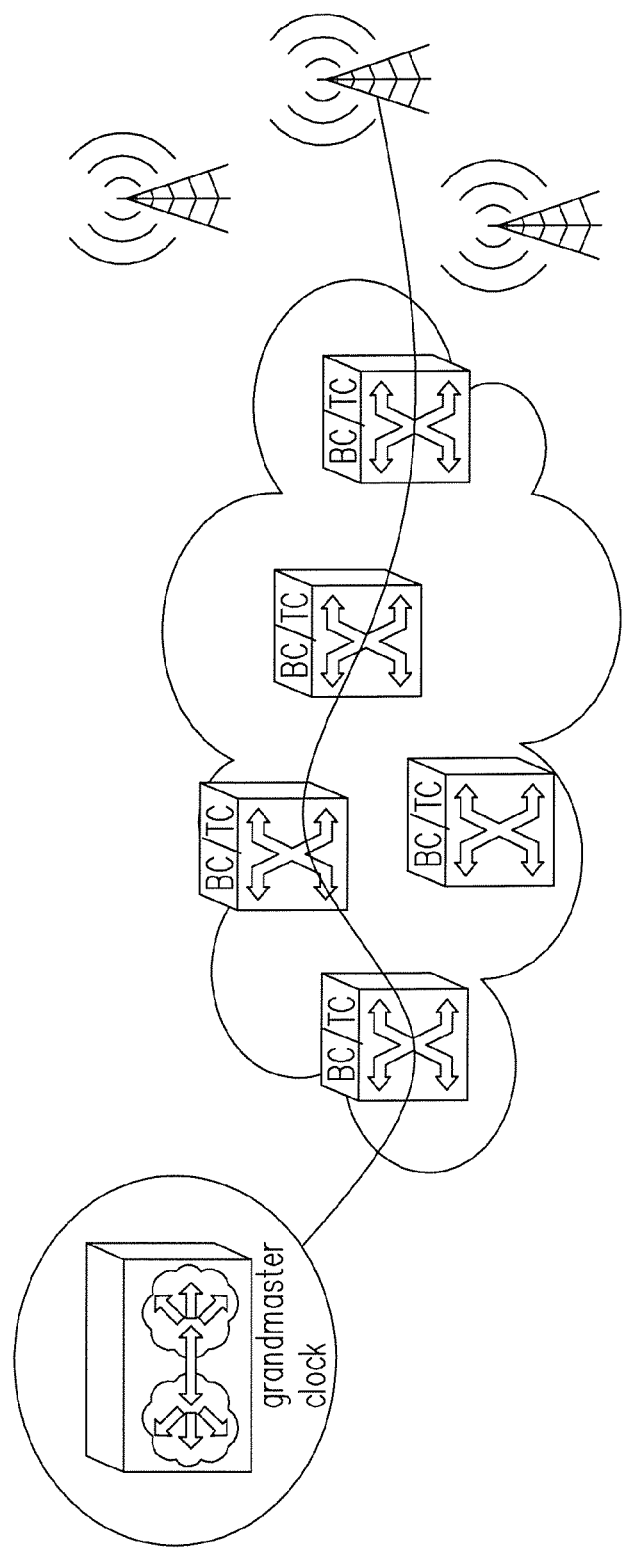
FIG. 1A is a schematic diagram illustrating a clock synchronization architecture in an existing mobile network.
Figure 1B:
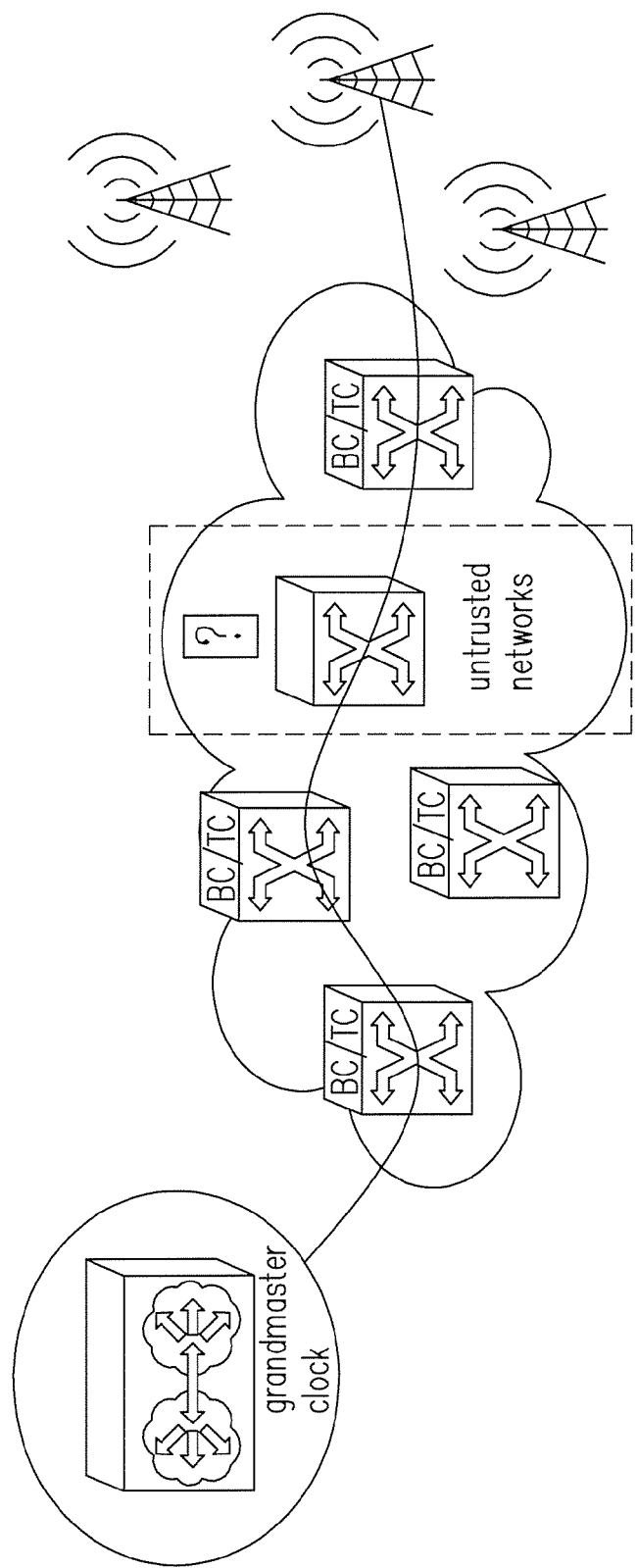
FIG. 1B is a schematic diagram illustrating a clock synchronization architecture may face the challenges in the existing mobile network.
Figure 2:
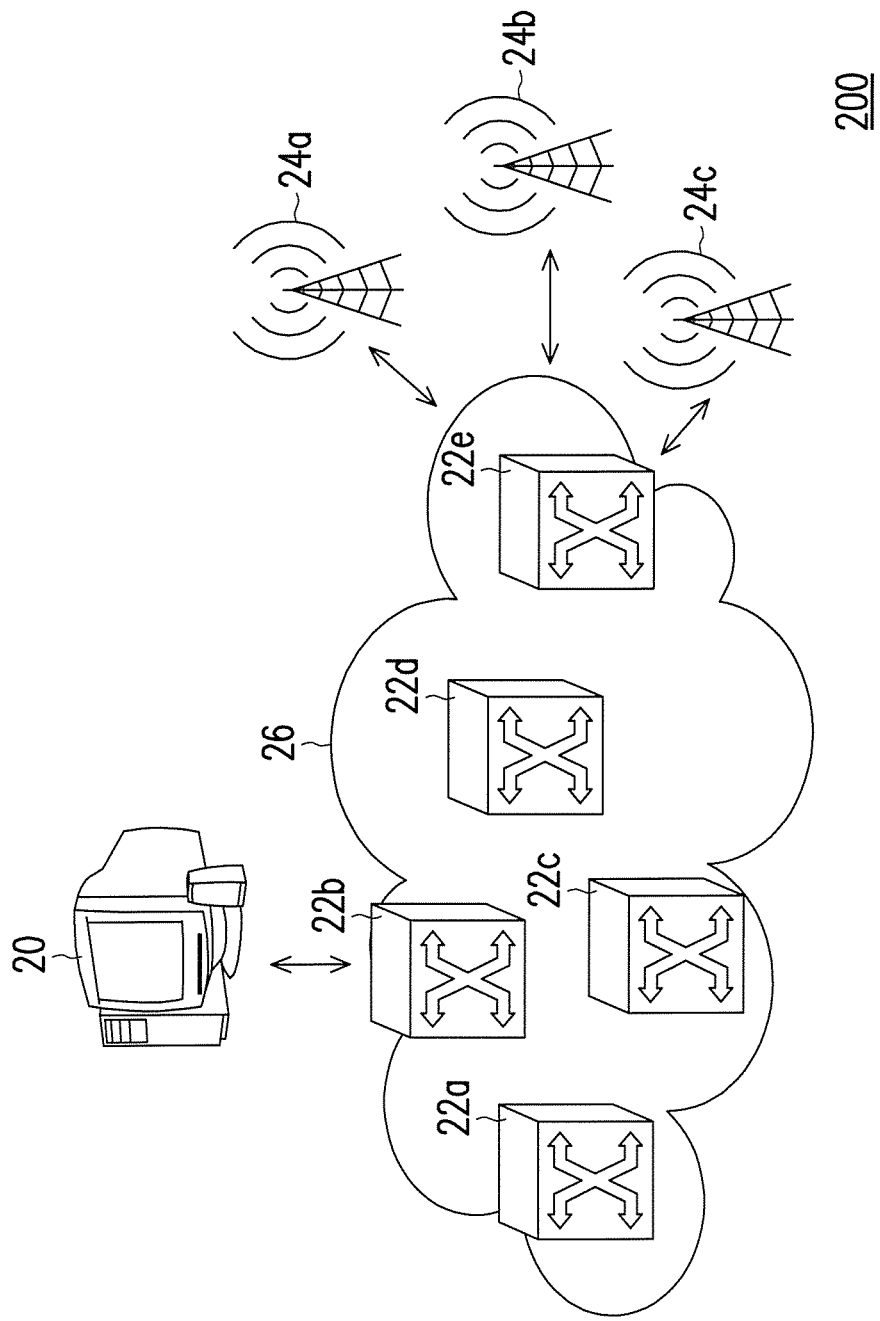
FIG. 2 is a schematic diagram illustrating a centralized mobile network system according to an exemplary embodiment of the disclosure.

FIG. 2 is a schematic diagram illustrating a centralized mobile network system according to an exemplary embodiment of the disclosure. Referring to FIG. 2, the centralized mobile network system 200 includes a network controller 20, a plurality of network switches 22a~22e, and a plurality of BSs 24a~24c. Wherein the network switches 22a~22e form a backhaul network 26. There is no limitation on the number of the network switches and BSs in the centralized mobile network system 200. In another exemplary embodiment, the centralized mobile network system 200, for example, may have other numbers of the network switches and BSs.

Figure 3A:
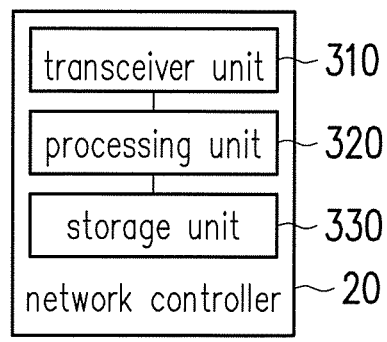
FIG. 3A is a schematic diagram illustrating a network controller according to an exemplary embodiment of the disclosure.

FIG. 3A is a schematic diagram illustrating a network controller according to an exemplary embodiment of the disclosure. Referring to FIG. 3A, the network controller 20 includes a transceiver unit 310, a processing unit 320, and a storage unit 330. The transceiver unit 310 and the storage unit 330 are coupled to the processing unit 320, respectively.

The transceiver unit 310 has functions of general network interface card and transmits and receives signals to and from the BSs 24a~24c or the network switches 22a~22e. The transceiver unit 310 may be a signal transmission device and supports such as a Global System for Mobile Communications (GSM), a personal handy-phone system (PHS), a code division multiple access (CDMA), an LTE, a worldwide interoperability for the microwave access (WiMAX), and the wireless fidelity (Wi-Fi).

The processing unit 320, for example, may be a general purpose processor, a special purpose processor, a conventional processor, a digital signal processor (DSP), a plurality of microprocessors, one or more microprocessors in conjunction with a DSP core, a controller, a microcontroller, an application specific integrated circuit (ASIC), a field programmable gate array (FPGA), a state machine, or an Advanced RISC Machine (ARM), one of other programmable logic devices.

The storage unit 330, for example, may be chosen from at least one of the group of an any form of fixed or movable random access memory (RAM), a read-only memory (ROM), an erasable programmable read-only memory (EPROM or Flash memory), a portable compact disc read-only memory (CD-ROM), an optical storage device, a hard disk, or any suitable combination of the aforementioned.

In the exemplary embodiment of the disclosure, a plurality of program codes stored in the storage unit 330 may be installed and executed via the processing unit 320. For example, the storage unit 330 includes a plurality modules for implementing the functions/acts/steps of the clock synchronization method in the centralized mobile network system 200, wherein at least a piece of the plurality of program codes from one or more memory modules in the storage unit 330 may be organized to function as the said modules.

In the exemplary embodiment of the disclosure, the network switches 22a~22e are embodied in a similar form. Therefore, the following may take the network switch 22a as an example to describe the function of each of the network switches 22a~22e.

Figure 3B:
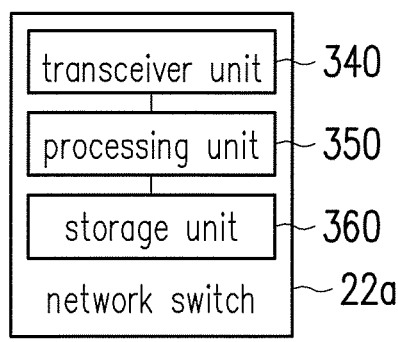
FIG. 3B is a schematic diagram illustrating a network switch according to an exemplary embodiment of the disclosure.

FIG. 3B is a schematic diagram illustrating a network switch according to an exemplary embodiment of the disclosure. Referring to FIG. 3B, the network switch 22a includes a transceiver unit 340, a processing unit 350, and a storage unit 360. The transceiver unit 340 and a storage unit 360 are coupled to the processing unit 350, respectively. The transceiver unit 340, the processing unit 350, and the storage unit 360 are respectively similar to the transceiver unit 310, the processing unit 320, and the storage unit 330 shown in FIG. 3A, thus related description is omitted hereinafter.

Similarly, in the exemplary embodiment of the disclosure, a plurality of program codes stored in the storage unit 360 may be installed and executed via the processing unit 350. For example, the storage unit 360 includes a plurality modules for implementing the functions/acts/steps of the clock synchronization method in the centralized mobile network system 200, wherein at least a piece of the plurality of program codes from one or more memory modules in the storage unit 360 may be organized to function as the said modules.

Please referring to FIG. 2 again, the BSs 24a~24c may be, for example, a macro BS, a pico BS, a femto BS, a home base station, or one of other types of base stations, which is not limited by the disclosure.

Figure 4:
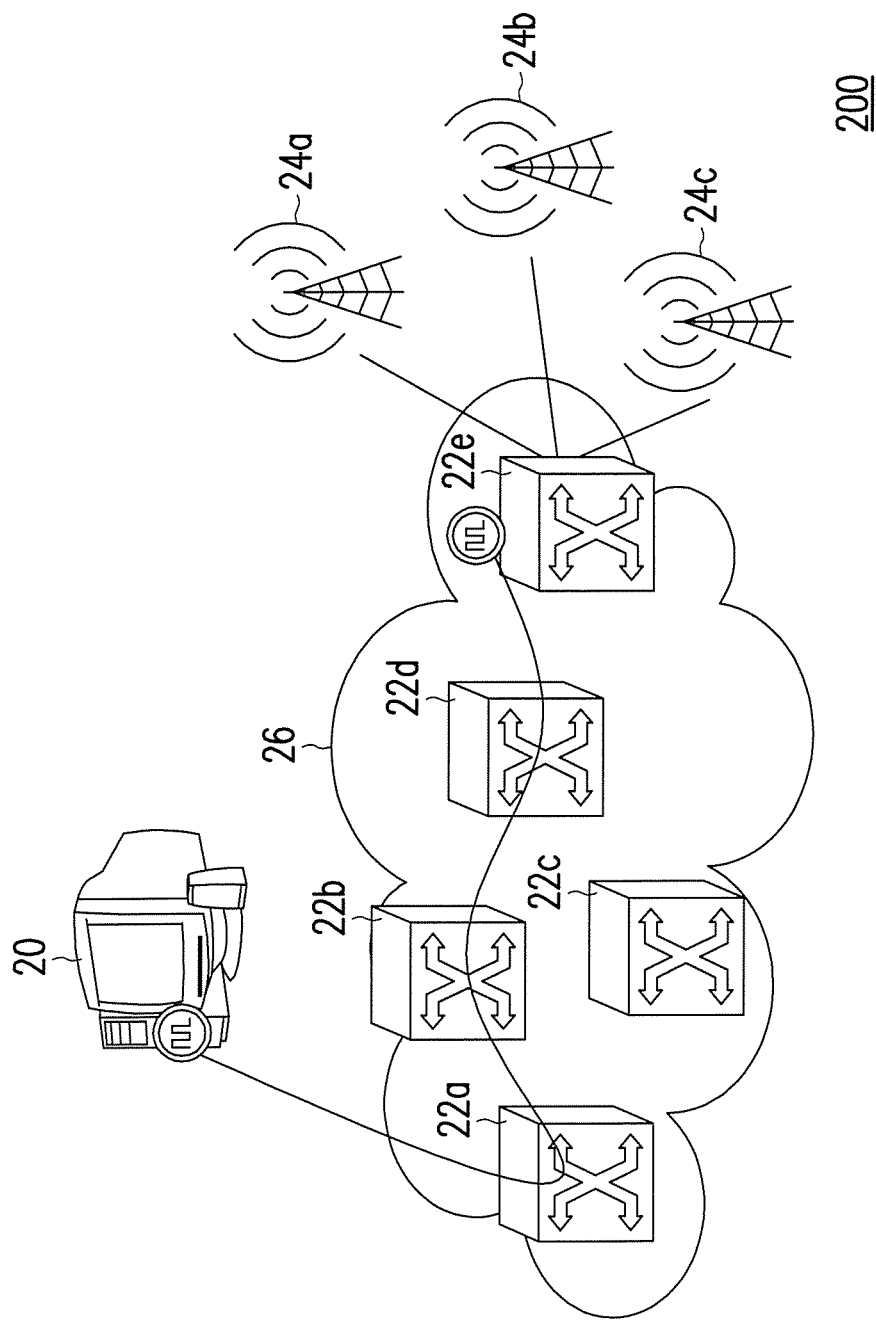
FIG. 4 is a schematic diagram illustrating a centralized mobile network system according to an exemplary embodiment of the disclosure.

In the conventional synchronous network, the data channel of LTE S1 interface is used to transmit the synchronization messages. Wherein after each network switch on the path between the master clock to the BSs updates the received the clock information in the synchronous messages (for example, in a BC/TC way), then the synchronous messages on the path are transmitted to the next network switch. When the BS receives the synchronous messages, the BS synchronizes with the master clock according to the received synchronous messages. Namely, clock synchronous in the conventional network is distributed. FIG. 4 is a schematic diagram illustrating a centralized mobile network system according to an exemplary embodiment of the disclosure. Please refer to FIG. 4. In the exemplary embodiment of the disclosure, the centralized mobile network system 200 runs based on the software defined networking (SDN) architecture. The network switches 22a~22e may be separated as the control plane and the data plane, therefore the network controller 20 can perform a centralized manage on the data flow, and the SDN network controller 20 has a global view of the network system and controls the network system. In the exemplary embodiment of the disclosure, the network controller 20 may directly synchronize with the network switches 22a~22e through a SDN control channel. Take FIG. 4 as an example, the network controller 20 may directly synchronize with the network switch 22e through the SDN control channel. The network switches 22a, 22b, 22d on the path between the network controller 20 and the network switch 22e only transmit the synchronous messages packets, and do not change the clock information in the synchronous messages transmitted to the network switch 22e. In other words, the network controller 20 ⌈logically⌋ directly synchronizes with the network switch 22e, and does not need to pass through the network switches 22a, 22b, 22d to update the synchronous messages in a stepwise fashion. The description provided below only takes the network controller 20 synchronized with the network switch 22e as an exemplary embodiment. In the exemplary embodiments of the disclosure, the network controller is a SDN controller 20, and the network switches 22a~22e are the SDN switches.

Figure 5:
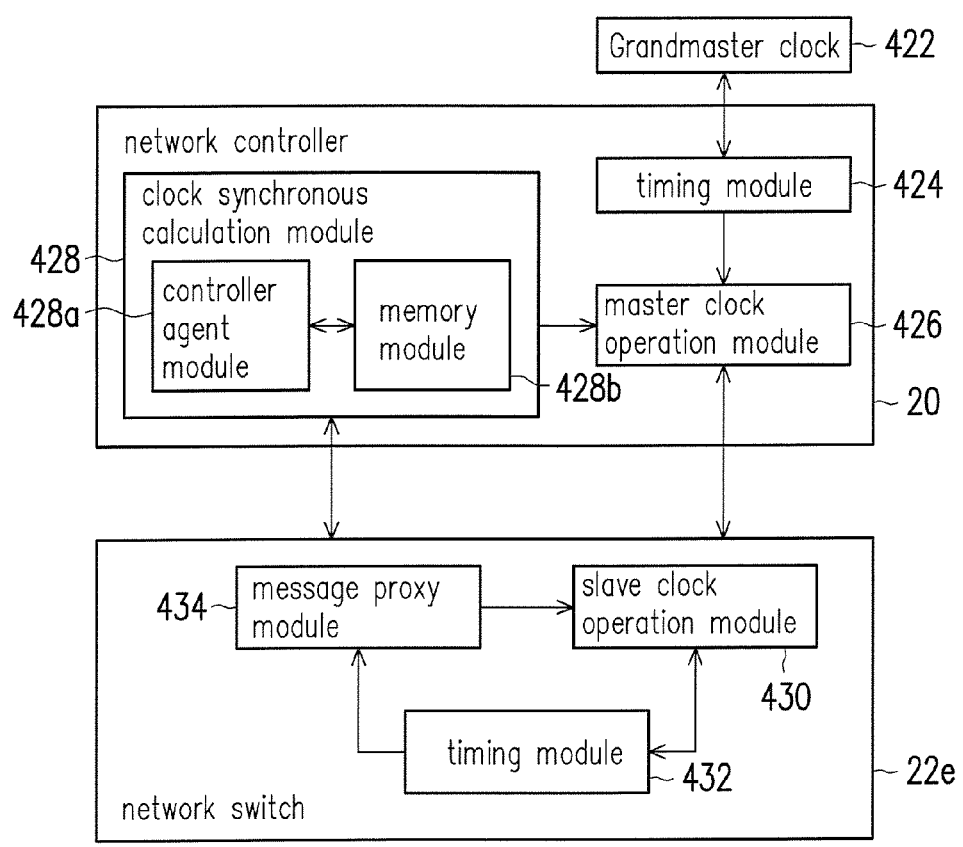
FIG. 5 is a schematic diagram illustrating the modules of the network controller and the network switch according to an exemplary embodiment of the disclosure.

FIG. 5 is a schematic diagram illustrating the modules of the network controller and the network switch according to an exemplary embodiment of the disclosure.

Referring to FIG. 5, the network controller 20 includes a timing module 424, a master clock operation module 426, and a clock synchronous calculation module 428 having a controller agent module 428a and a memory module 428b.

The network switch 22e includes a slave clock operation module 430, a timing module 432, and a message proxy module 434.

In the exemplary embodiment of the disclosure, the clock synchronous calculation module 428 of the network controller 20 calculates a round-trip delay ratio between the network controller 20 and the network switch 22e according to a first delay, of which the network controller 20 transmits a packet to the network switch 22e, and a second delay, of which the network switch 22e transmits another packet to the network controller 20.

The timing module 424 of the network controller 20 will synchronizes the clock of the network controller 20 with the Grandmaster clock 422, and obtains a precision synchronous clock as a master clock of the network controller 20. The timing module 424 can lock the clock synchronizing with the Grandmaster clock 422 by using the way of 10 MHz, apps or IEEE 1588v2. The timing module 424 provides the clock being locked to the master clock operation module 426 as a master clock to synchronize with the network switch 22e.

Next, the clock synchronous calculation module 428 sets and provides the related parameters of the time-transfer protocol (e.g., IEEE 1588v2) to the master clock operation module 426. In one exemplary embodiment of the disclosure, the network switch 22e synchronizes with the network controller 20 based on the time-transfer protocol (e.g., IEEE 1588v2).

Thereafter, the master clock operation module 426 runs an operation of the time-transfer protocol (e.g., IEEE 1588v2) with the slave clock operation module 430 of the network switch 22e according to the synchronized clock of the network controller 20 and the parameters provided by the clock synchronous calculation module 428. First, the master clock operation module 426 transmits a time-of-day (TOD) packet to the slave clock operation module 430 to update the slave clock/time. The clock synchronous calculation module 428 calculates a round-trip delay ratio between the network controller 20 and the network switch 22e according to a first delay, of which the packet is exchanged back and forth several times between the network controller 20 and the network switch 22e, and a second delay, of which the another packet is exchanged back and forth several times between the network switch 22e and the network controller 20.

Figure 6:
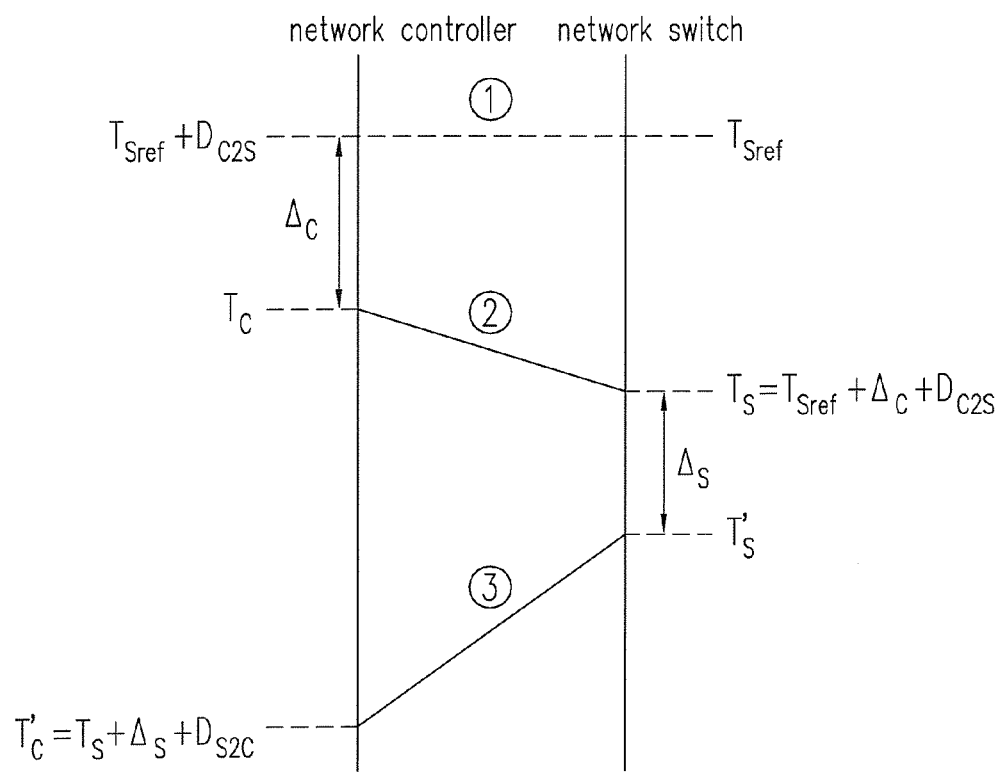
FIG. 6 is a schematic diagram illustrating an example of calculating a round-trip delay ratio according to an exemplary embodiment of the disclosure.

FIG. 6 is a schematic diagram illustrating an example of calculating a round-trip delay ratio according to an exemplary embodiment of the disclosure.

Please refer to FIG. 5 and FIG. 6. Assume that the master clock operation module 426 of the network controller 20 transmits a TOD packet (referred to as a first packet) at a time $T_{Sref}$ (referred to as a first time) to the network switch 22e, and the time of receiving the first packet by the network switch 22 is recorded as the time $T_{Sref}$. Then, the slave clock operation module 430 of the network switch 22e records the time of receiving the first packet as the time $T_{Sref}$. When the time at the network switch 22e is recorded as the time $T_{Sref}$, the network controller 20 is updated as at a time $(T_{Sref}+D_{C2S})$ (referred to as a second time). Wherein time $(T_{Sref}+D_{C2S})$ is adding up the time $T_{Sref}$ and the delay $D_{C2S}$ (referred to as a first delay). Delay $D_{C2S}$ represents a delay time of the network controller 20 transmitting a packet to the network switch 22e.

Thereafter, the clock synchronous calculation module 428 of the network controller 20 transmits a second packet at a time $T_C$ (referred to as a third time) to the message proxy module 434 of the network switch 22e. In the exemplary embodiment of the disclosure, the clock synchronous calculation module 428 transmits the second packet in a form of experimenter of the Open Flow protocol. Here, a time interval $\Delta_C$ (referred to as a first time interval) is the difference between the time $T_C$ and the time $(T_{Sref}+D_{C2S})$.

The message proxy module 434 of the network switch 22e receives the second packet at a time $T_S$ (referred to as a fourth time) from the network controller 20, wherein the time $T_S$ recorded in the network switch 22e is adding up the time $T_{Sref}$, the time interval $\Delta_C$ and the delay $D_{C2S}$ of the second packet (that is, $T_S=T_{Sref}+\Delta_C+D_{C2S}$). The message proxy module 434 of the network switch 22e transmits a third packet at a time $T'_S$ (referred to as a fifth time) to the controller agent module 428a of the network controller 20, wherein a time interval $\Delta_S$ (referred to as a second time interval) is the difference between the time $T'_S$ and the time $T_S$.

The second packet transmitted to the network switch 22e by the network controller 20 is to inform the network switch 22e to transmit a third packet to the network controller 20 at the time $T'_S$ after receiving the second packet at the time $T_S$, wherein the third packet includes the time interval $\Delta_S$ between time $T'_S$ and time $T_S$. Especially, the third packet includes the information of time $T_{Sref}$ and time $T_S$, wherein time $T_S$ is adding up the time $T_{Sref}$, the time interval $\Delta_C$ and the delay $D_{C2S}$ (that is, $T_S-T_{Sref}+\Delta_C+D_{C2S}$).

Then, the controller agent module 428a of the network controller 20 receives the third packet at the time $T'_C$ (referred to as a sixth time), wherein time $T'_C$ is adding up the time $T_S$, the time interval $\Delta_S$ and the delay $D_{S2C}$ (that is, $T'_C=T_S+\Delta_S+D_{S2C}$). Delay $D_{S2C}$ (referred to as a second delay) represents a delay time of the network switch 22e transmitting a packet to the network controller 20.

After the controller agent module 428a of the network controller 20 receives the third packet at the time $T'_C$, the network controller 20 has the information of time $T_S$, time $T_{Sref}$, time $T'_C$, time interval $\Delta_S$ (second time interval), and time interval $\Delta_C$ (first time interval). Therefore, the clock synchronous calculation module 428 of the network controller 20 may calculate the delay $D_{C2S}$ according to the time $T_S$, the time $T_{Sref}$ and the time interval $\Delta_C$, and calculate the delay $D_{S2C}$ according to the time $T'_C$, the time $T_S$, and the time interval $\Delta_S$. The time $T_S$ is adding up the time $T_{Sref}$, the time interval $\Delta_C$ and the delay $D_{C2S}$, therefore, the clock synchronous calculation module 428 obtains the delay $D_{C2S}$, which is the time $T_S$ minus both the time $T_{Sref}$ and the time interval $\Delta_C$ (that is, $D_{C2S}=T_S-T_{Sref}-\Delta_C$). Similarly, time $T'_C$ is adding up the time $T_S$, the time interval $\Delta_S$ and the delay $D_{S2C}$, therefore, the clock synchronous calculation module 428 obtains the delay $D_{S2C}$, which is subtracting both the time $T_S$ and the time interval $\Delta_S$ from the time $T'_C$ (that is, $D_{S2C}=T'_C-T_S-\Delta_S$).

Thereafter, the clock synchronous calculation module 428 calculates the round-trip delay ratio K according to the delay $D_{C2S}$ and the delay $D_{S2C}$. The clock synchronous calculation module 428 obtains the round-trip delay ratio K, which is the delay $D_{C2S}$ divided by the delay $D_{S2C}$ (that is, $K=D_{C2S}/D_{S2C}$). In other words, the round-trip delay ratio K represents the ratio of the delay time of a two-way path between the network controller 20 and the network switch 22e.

In one exemplary embodiment of the disclosure, the network controller 20 may be repeatedly measured (for example, repeatedly perform the procedure described in FIG. 6) and records a plurality of delays (for example, obtains a delay of each measurement), of which the network controller 20 transmits packets to the network switch 22e, and a plurality of delays (for example, obtains a delay of each measurement), of which the network switch 22e transmits another packets to the network controller 20. The network controller 20 obtains the first delay $D_{C2S}$ according to the plurality of delays, of which the network controller 20 transmits the packets to the network switch 22e. For example, the network controller 20 obtains the first delay $D_{C2S}$ according to the average of the plurality of delays via multiple measurements. Or, the network controller 20 removes some of the plurality of delays having the large variation firstly (for example, a delay which is greater than a predetermined upper limit threshold or smaller than a predetermined lower limit threshold) of transmitting packets from the network controller 20 to the network switch 22e, then calculates the average of the rest of the delays as the first delay $D_{C2S}$. However, the disclosure may be, but not limited to the way that the network controller 20 obtains the first delay $D_{C2S}$ according to the plurality of recorded delays.

Similarly, the network controller 20 obtains the second delay $D_{S2C}$ according to the plurality of delays, of which the network switch 22e transmits another packets to the network controller 20. For example, the network controller 20 obtains the second delay $D_{S2C}$ according to the average of the plurality of delays $D_{S2C}$ via multiple measurements. In the same manner, the network controller 20 removes some of the plurality of delays having the large variation firstly (for example, a delay which is greater than a predetermined upper limit threshold or smaller than a predetermined lower limit threshold) of transmitting packets from the network switch 22e to the network controller 20, then calculates the average of the rest of the delays as the second delay $D_{S2C}$. However, the disclosure may be, but not limited to the way that the network controller 20 obtains the second delay $D_{S2C}$ according to the plurality of recorded delays. Thereafter, the network controller 20 obtains the round-trip delay ratio K, which is the first delay $D_{C2S}$ divided by the second delay $D_{S2C}$.

After calculating the round-trip delay ratio K, the clock synchronous calculation module 428 of the network controller 20 stores the round-trip delay ratio K in the storage unit 330 through the memory module 428b. The network controller 20 may respectively calculate the corresponding round-trip delay ratio K of each of the network switches 22a~22e, and store the corresponding round-trip delay ratio K of each of the network switches 22a~22e in the storage unit 330 by the memory module 428b.

Please refer to FIG. 5 again. After the clock synchronous calculation module 428 of the network controller 20 calculates the round-trip delay ratio K of the network switch 22e, the clock synchronous calculation module 428 of the network controller 20 transmits the round-trip delay ratio K corresponding to the network switch 22e to the message proxy module 434 of the network switch 22e. When the message proxy module 434 of the network switch 22e receives the round-trip delay ratio K corresponding to the network switch 22e, the message proxy module 434 transmits the round-trip delay ratio K to the slave clock operation module 430. Then, the clock synchronous calculation module 428 transmits the round-trip delay ratio K in a form of experimenter of the Open Flow protocol.

The slave clock operation module 430 of the network switch 22e receives the round-trip delay ratio K corresponding to the network switch 22e. The timing module 432 of the network switch 22e performs the clock locking adjustment procedure to lock the clock (referred to as a first clock) of the network switch 22e based on the time-transfer protocol with the round-trip delay ratio K. And the first clock is synchronized with the master clock of the network controller 20. Accordingly, the slave clock operation module 430 sets the first clock being locked as a runtime clock of the network switch 22e.

For example, after the slave clock operation module 430 of the network switch 22e receives the round-trip delay ratio K, the slave clock operation module 430 runs an operation of the time-transfer protocol (e.g., IEEE 1588v2) with the round-trip delay ratio K to obtain a time offset (referred to as Offset) used for clock calibration to proceed the clock synchronous locking. Wherein the time offset is the time difference between the network controller 20 and the network switch 22e.

Figure 7:
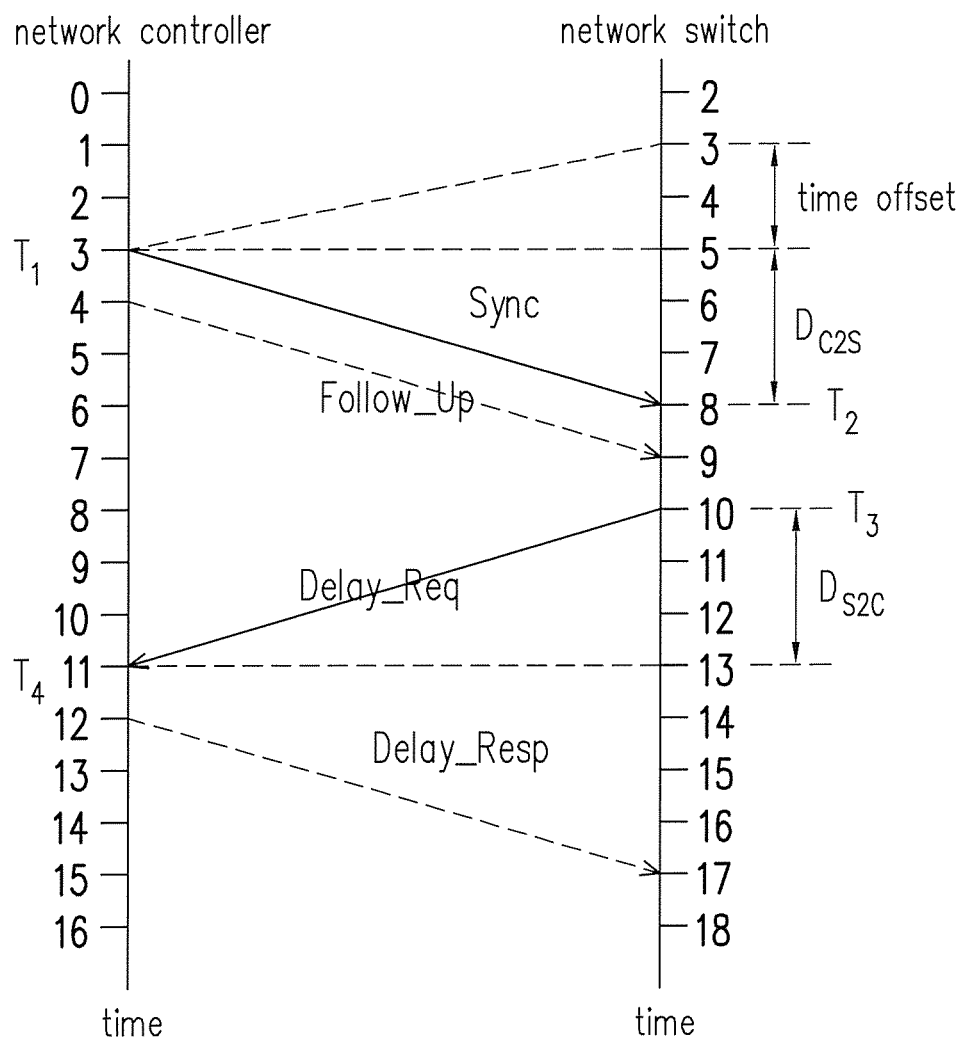
FIG. 7 is a schematic diagram illustrating an example of calculating the time offset according to an exemplary embodiment of the disclosure.

FIG. 7 is a schematic diagram illustrating an example of calculating the time offset according to an exemplary embodiment of the disclosure.

Please refer to FIG. 5 and FIG. 7. After the network controller 20 and the network switch 22e exchanging a plurality of packets (for example, the message packets of Sync, Follow-Up, Delay_Req, Delay_Resp, etc. in FIG. 7), the network switch 22e calculates the time offset of the network switch 22e corresponding to the network controller 20.

First, the master clock operation module 426 of the network controller 20 transmits a packet (referred to as a fourth packet) having a Sync message at a time $T_1$ (referred to as a seventh time) to the slave clock operation module 430 of the network switch 22e. Next, the slave clock operation module 430 of the network switch 22e receives the fourth packet at a time $T_2$ (referred to as an eighth time). The master clock operation module 426 of the network controller 20 transmits a packet having a Follow-Up message to the slave clock operation module 430 of the network switch 22e after having transmitted the fourth packet, wherein the Follow-Up message includes the information of the time $T_1$ in the fourth packet transmitted by the network controller 20.

Thereafter, the slave clock operation module 430 of the network switch 22e transmits a packet (referred to as a fifth packet) having a Delay_Req message at a time $T_3$ (referred to as a ninth time) to the master clock operation module 426 of the network controller 20, wherein the Delay_Req message is used to request the network controller 20 to respond a time $T_4$ (referred to as a tenth time) at which the fifth packet arrives at the network controller 20.

After the master clock operation module 426 of the network controller 20 receives the fifth packet at the time $T_4$, the master clock operation module 426 of the network controller 20 replies a packet having a Delay_Resp message to the slave clock operation module 430 of the network switch 22e to inform the network switch 22e of the time $T_4$ at which the fifth packet arrives at the network controller 20.

Since the network switch 22e already have the information of the time $T_1$, the time $T_2$, the time $T_3$, the time $T_4$, and the round-trip delay ratio K, the network switch 22e may calculate the time offset between the network controller 20 and the network switch 22e according to the time $T_1$ which the network controller 20 transmitted the fourth packet, the time $T_2$ at which the network switch 22e receives the fourth packet, the time $T_3$ at which the network switch 22e transmits the fifth packet, the time $T_4$ at which the network controller 20 receives the fifth packet, and the round-trip delay ratio K.

The round-trip delay ratio K represents that the delay $D_{C2S}$ is K times of the delay $D_{S2C}$, therefore, it may be expressed as the following equation (1):

$$D_{C2S}=K D_{S2C} \qquad \text{equation (1)}$$

According to FIG. 7, the relationship among the time offset (hereinafter referred to as Offset), the time $T_1$ at which the network controller 20 transmits the fourth packet, and the time $T_2$ at which the network switch 22e receives the fourth packet can be expressed as the following equation (2):

$$\text{Offset}=T_2-(T_1+D_{C2S}) \qquad \text{equation (2)}$$

Similarly, according to FIG. 7, the relationship among the time offset (Offset), the time $T_3$ at which the network switch 22e transmits the fifth packet, and the time $T_4$ at which the network controller 20 receives the fourth packet can be expressed as the following equation (3):

$$(-\text{Offset}) = T_4 - (T_3 + D_{S2C}) \quad \text{equation (3)}$$

Adding up equation (2) and equation (3) can obtain equation (4).

$$D_{C2S} + D_{S2C} = T_2 - T_1 + T_4 - T_3 \quad \text{equation (4)}$$

Then, in the equation (4), substituting $D_{C2S}$ by equation (1) can obtain equation (5):

$$K D_{S2C} + D_{S2C} = T_2 - T_1 + T_4 - T_3 \quad \text{equation (5)}$$

From equation (5), $D_{S2C}$ can be expressed as the following equation (6):

$$D_{S2C} = (T_2 - T_1 + T_4 - T_3)/(K+1) \quad \text{equation (6)}$$

Finally, in the equation (3), substituting $D_{S2C}$ by equation (6) can obtain the time offset (Offset) as the following equation (7):

$$\text{Offset} = ((T_2 - T_1 + T_4 - T_3)/(K+1)) - (T_4 - T_3) \quad \text{equation (7)}$$

Namely, according to equation (7), the network switch 22e may calculate the time offset (Offset) between the network controller 20 and the network switch 22e, according to the time $T_1$ at which the network controller 20 transmits the fourth packet, the time $T_2$ at which the network switch 22e receives the fourth packet, the time $T_3$ at which the network switch 22e transmits the fifth packet, the time $T_4$ at which the network controller 20 receives the fifth packet, and the round-trip delay ratio K.

After the slave clock operation module 430 of the network switch 22e calculates the time offset (Offset) between the network controller 20 and the network switch 22e based on the time-transfer protocol with the round-trip delay ratio K, the timing module 432 of the network switch 22e performs the clock locking adjustment procedure to lock a clock (referred to as a first clock) according to the time offset (Offset). Thereafter, the timing module 432 of the network switch 22e provides the first clock being locked to the slave clock operation module 430 as a runtime clock. Wherein locking the first clock of the network switch 22e according to the time offset (Offset) is based on the time-transfer protocol (e.g., IEEE 1588v2), and the detailed is not repeated again.

The network switch 22e, for example, may periodically calculate the time offset (Offset) between the network controller 20 and the network switch 22e. The message proxy module 434 using OpenFlow periodically transmits the synchronization status message to the network controller 20, wherein the synchronization status message includes the time offset (Offset). Similarly, the controller agent module 428a of the network controller 20 may periodically receive the synchronization status message from the network switch 22e, wherein the synchronization status message includes the time offset (Offset). The controller agent module 428a of the network controller 20 may also periodically update the synchronization status message corresponding to the network switch 22e and stored in the storage unit 330 by the memory module 428b according to the received synchronization status message. The clock synchronous calculation module 428 of the network controller 20 may manage the network switch 22e according to the synchronization status message.

Figure 8:
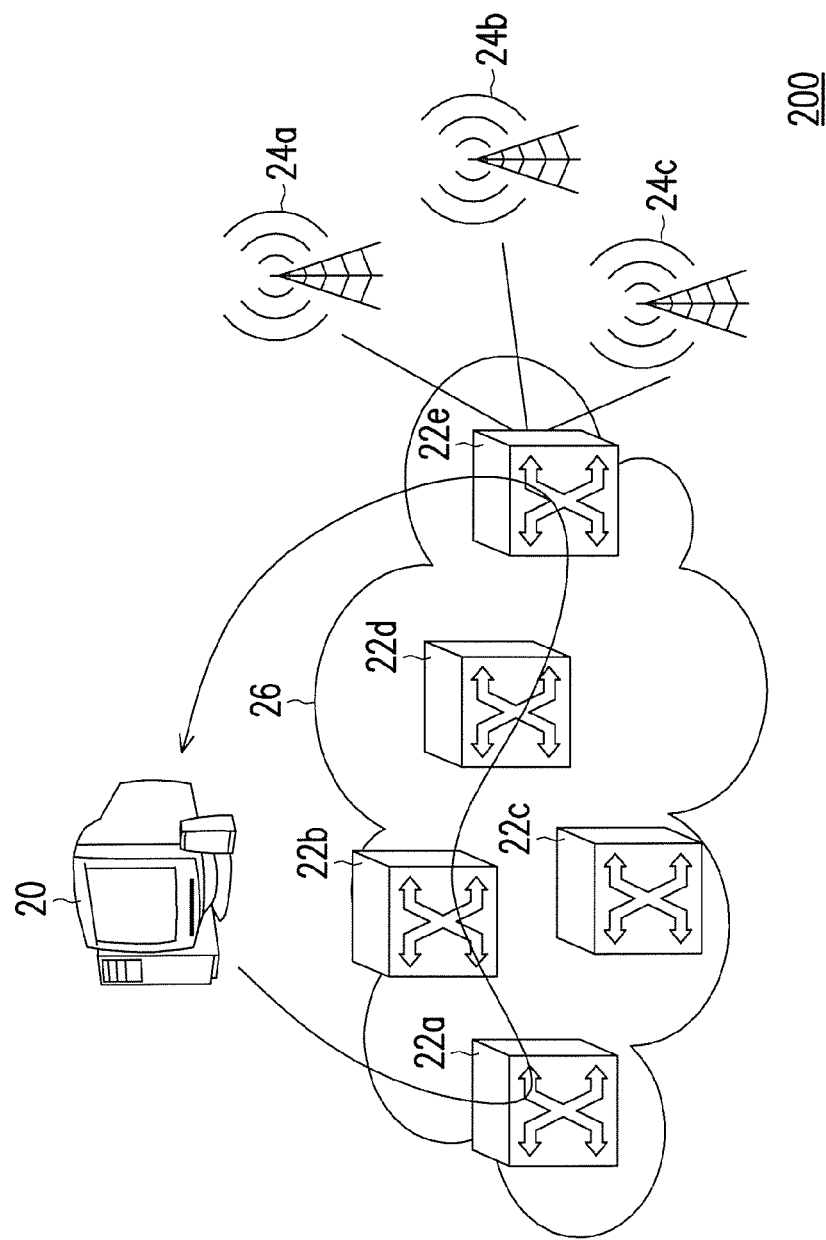
FIG. 8 is a schematic diagram illustrating an example of managing the network switches according to an exemplary embodiment of the disclosure.

FIG. 8 is a schematic diagram illustrating an example of managing the network switches according to an exemplary embodiment of the disclosure.

Please refer to FIG. 8. Because each network switch 22a~22e may periodically calculate the time offset (Offset) and transmit the synchronization status message having the time offset (Offset) to the network controller 20, the network controller 20 may determine whether or not at least one module of one of the network switches 22a~22e breaks down.

In one exemplary embodiment of the disclosure, if the controller agent module 428a of the network controller 20 does not receive the synchronization status message from the network switch 22e after a period of a time threshold, the network controller 20 may determine the network switch 22e may break down or one of the modules operating in the network switch 22e breaks down. In this case, the operator can check the network switch 22e instantly.

Or, in another exemplary embodiment of the disclosure, if the controller agent module 428a of the network controller 20 continuously receives the synchronization status messages from the network switch 22e. The clock synchronous calculation module 428 of the network controller 20 may determine the value of time offset (Offset) of the synchronization status messages does not converge to a certain value (for example, one microsecond) yet. For example, after a time threshold, the clock synchronous calculation module 428 of the network controller 20 determines the value of time offset (Offset) of the synchronization status messages does not converge to a certain value, the network controller 20 may determine the network switch 22e may break down or the synchronization module operating in the network switch 22e breaks down. In this case, the operator can check the network switch 22e instantly.

The way described above of detecting whether or not the network switch 22e breaks down may reduce the time of the operator to detect and repair the fault of the network switch 22e.

Figure 9:
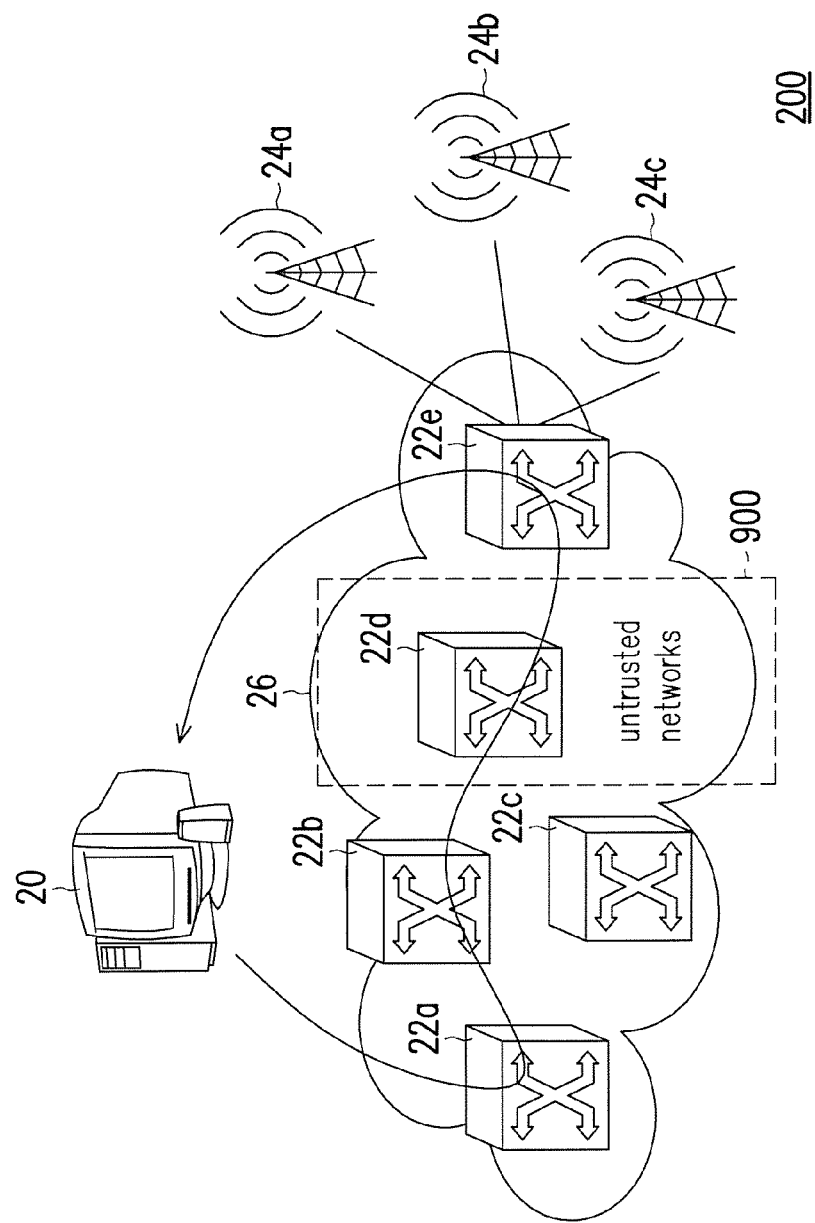
FIG. 9 is a schematic diagram illustrating an example of transmitting the synchronization messages through a third-party untrusted network according to an exemplary embodiment of the disclosure.

In addition, the exemplary embodiments of the disclosure may be applied to the case that there may be one or more third-party untrusted networks in a backhaul network. FIG. 9 is a schematic diagram illustrating an example of transmitting the synchronization messages through a third-party untrusted network according to an exemplary embodiment of the disclosure.

Please refer to FIG. 9. In the exemplary embodiment of the disclosure, assume that the network controller 20 communicates and synchronizes with the network switch 22e through a third-party untrusted network 900. Because the exemplary embodiment of the disclosure is running based on a SDN centralized architecture, the network controller 20 logically directly synchronized with the network switch 22e and does not need to pass through the network switches 22a, 22b, 22d on the path to the network switch 22e to update the synchronous message in a stepwise fashion. Therefore, although the network switch (for example, the network switch 22d) in the third-party untrusted network 900 does not support the time-transfer protocol (e.g., IEEE 1588v2), the synchronous message is still transmitted to the network switch 22e by passing through the third-party untrusted network 900. The network switch 22e may calculate the time offset between the network controller 20 and the network switch 22e according to the procedure in FIG. 5~FIG. 7, and further perform the clock locking adjustment procedure according to the time offset.

In one exemplary embodiment of the disclosure, the storage unit 330 of the network controller 20 stores the synchronous messages of each network switch 22a~22e, therefore the network controller 20, for example, transmitting the packets on the path to the network switch 22e, may obtain the delay time that the packets passing through the third-party untrusted network 900 or the other information about the third-party untrusted network 900 according to the synchronous messages of the network switch (that is, network switch 22b). Wherein the said delay time or the other information can be obtained before the packets enters into the third-party untrusted network 900 and the synchronous messages of the network switch (that is, network switch 22e) after the packets leave the third-party untrusted network 900. The round-trip delay ratio (hereinafter referred to as $K_B$) and the time offset (hereinafter referred to as $Offset_B$) corresponding to the network switch 22b, and the round-trip delay ratio (hereinafter referred to as $K_E$) and the time offset (hereinafter referred to as $Offset_E$) corresponding to the network switch 22e stored in the storage unit 330 of the network controller 20 will be periodically updated. The network controller 20 may calculate, for example in a statistical way, the delay time that the packets pass through the third-party untrusted network 900 or the other information about the third-party untrusted network 900, based on the time-transfer protocol with the round-trip delay ratio $K_B$ and the time offset $Offset_B$ corresponding to the network switch 22b and the time-transfer protocol with the round-trip delay ratio $K_E$ and the time offset $Offset_E$ corresponding to the network switch 22e. The clock synchronous calculation module 428 provides the delay time or the other information to the master clock operation module 426 to set related parameters of Precision Time Protocol (PTP) to reduce the delay variation that the packets pass through the third-party untrusted network 900.

Figure 10:
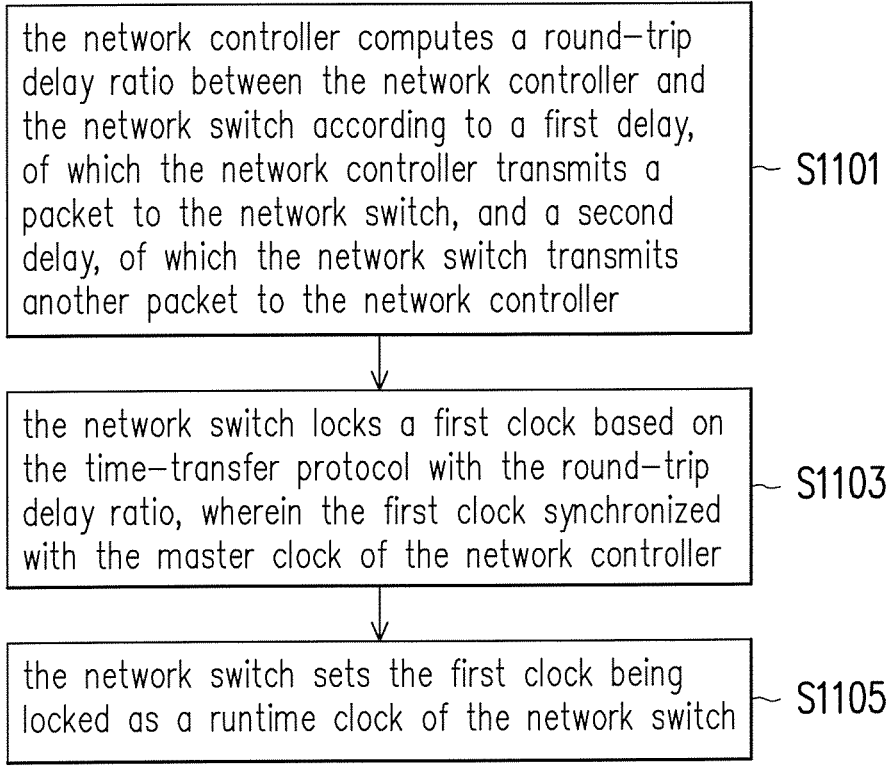
FIG. 10 is a flowchart illustrating a clock synchronization method in a mobile network according to an exemplary embodiment of the disclosure.
Figure 11:
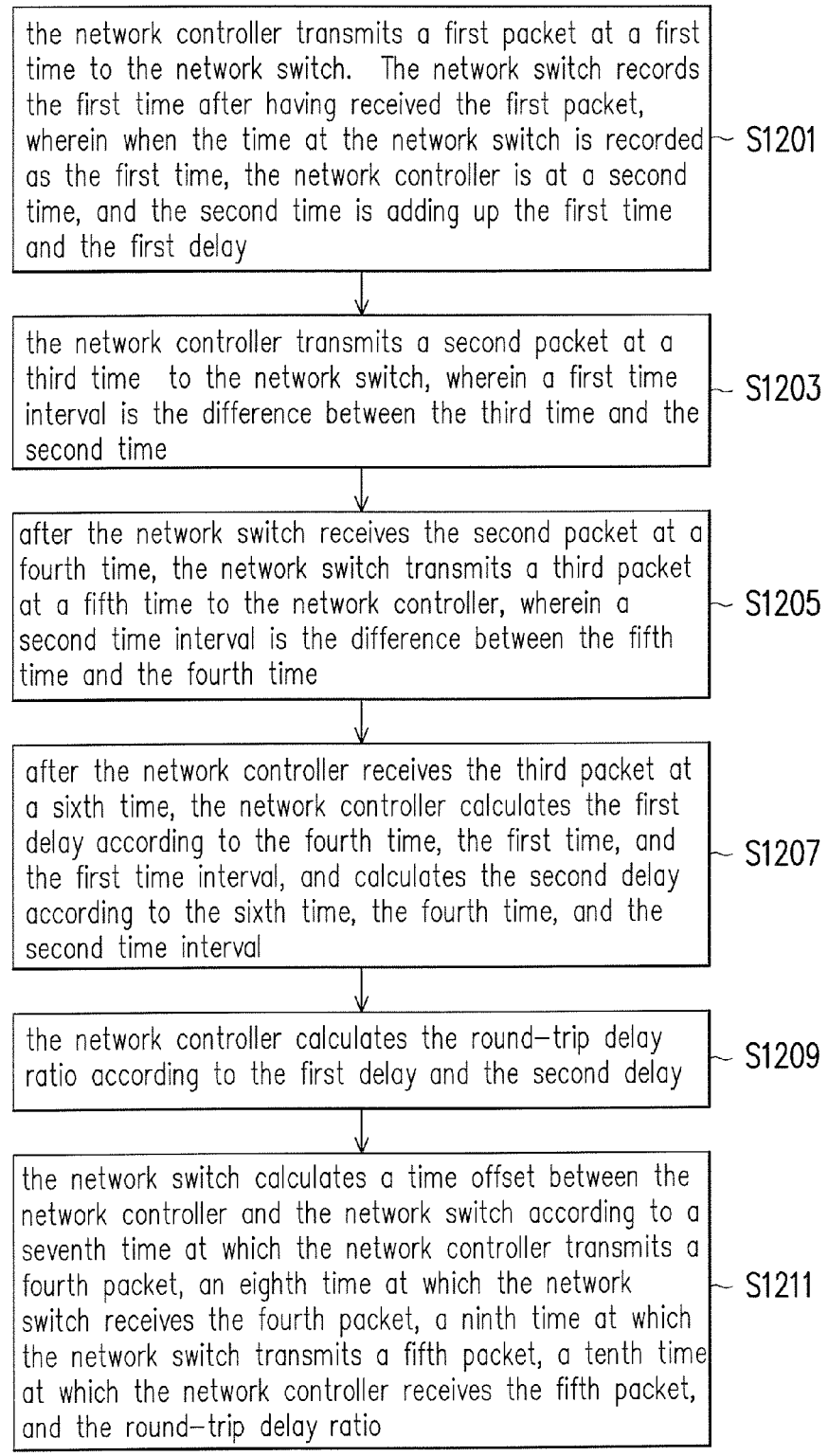
FIG. 11 is a flowchart illustrating an example of calculating a round-trip delay ratio and a time offset according to an exemplary embodiment of the disclosure.

FIG. 10 is a flowchart illustrating a clock synchronization method in a mobile network according to an exemplary embodiment of the disclosure. FIG. 11 is a flowchart illustrating an example of calculating a round-trip delay ratio and a time offset according to an exemplary embodiment of the disclosure.

Please refer to FIG. 10 and FIG. 11. In step S1101, the network controller 20 computes a round-trip delay ratio K between the network controller 20 and the network switch 22e according to a first delay, of which the network controller 20 transmits a packet to the network switch 22e, and a second delay $D_{S2C}$, of which the network switch 22e transmits another packet to the network controller 20.

Wherein, step S1101 further includes steps 1201~S1211 of FIG. 11. In step S1201, the network controller 20 transmits a first packet at a first time to the network switch 22e. The network switch 22e records the first time after having received the first packet, wherein when the time at the network switch 22e is recorded as the first time, the network controller 20 is at a second time, and the second time is adding up the first time and the first delay.

In step S1203, the network controller 20 transmits a second packet at a third time to the network switch 22e, wherein a first time interval is the difference between the third time and the second time.

In step S1205, after the network switch 22e receives the second packet at a fourth time, the network switch 22e transmits a third packet at a fifth time to the network controller 20, wherein a second time interval is the difference between the fifth time and the fourth time.

In step S1207, after the network controller 20 receives the third packet at a sixth time, the network controller 20 calculates the first delay according to the fourth time, the first time, and the first time interval, and calculates the second delay according to the sixth time, the fourth time, and the second time interval.

In step S1209, the network controller 20 calculates the round-trip delay ratio K according to the first delay and the second delay.

In step S1211, the network switch 22e calculates a time offset between the network controller 20 and the network switch 22e according to a seventh time at which the network controller 20 transmits a fourth packet, an eighth time at which the network switch 22e receives the fourth packet, a ninth time at which the network switch 22e transmits a fifth packet, a tenth time at which the network controller 20 receives the fifth packet, and the round-trip delay ratio K.

Thereafter, please refer to FIG. 10 again. In step S1103, the network switch 22e locks a first clock based on the time-transfer protocol with the round-trip delay ratio K, wherein the first clock is synchronized with the master clock of the network controller 20.

In step S1105, the network switch 22e sets the first clock being locked as a runtime clock of the network switch 22e.

In summary, the clock synchronization method in the mobile network in the exemplary embodiment of the disclosure; may perform the clock locking adjustment procedure based on the time-transfer protocol with the round-trip delay ratio, therefore may effectively improve the clock synchronization accuracy, effectively reduce the delay variation, and have a fault detection function.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A clock synchronization method, adapted to a centralized mobile network, comprising:
   computing a round-trip delay ratio between a network controller and a network switch according to a first delay, of which the network controller transmitting a packet to the network switch, and a second delay, of which the network switch transmitting another packet to the network controller;
   locking a first clock based on a time-transfer protocol with the round-trip delay ratio, wherein the first clock is synchronized with a master clock of the network controller; and
   setting the first clock being locked as a runtime clock of the network switch.

2. The clock synchronization method as claimed in claim 1, wherein before the step of computing the round-trip delay ratio between the network controller and the network switch according to the first delay, of which the network controller transmitting the packet to the network switch, and the second delay, of which the network switch transmitting the another packet to the network controller, further comprises:
   obtaining a second clock synchronized with a Grandmaster clock as the master clock of the network controller.

3. The clock synchronization method as claimed in claim 1, wherein the step of computing the round-trip delay ratio between the network controller and the network switch according to the first delay, of which the network controller transmitting the packet to the network switch, and the second delay, of which the network switch transmitting the another packet to the network controller comprises:
   transmitting, by the network controller, a first packet to the network switch at a first time, and recording the first time, by the network switch, after having received the first packet, wherein when a time at the network switch is recorded as the first time, the network controller is at a second time, and the second time is adding up the first time and the first delay;

transmitting, by the network controller, a second packet to the network switch at a third time, wherein a first time interval is the difference between the third time and the second time;

receiving, by the network switch, the second packet at a fourth time, and transmitting, by the network switch, a third packet to the network controller at a fifth time, wherein a second time interval is the difference between the fifth time and the fourth time;

receiving, by the network controller, the third packet at a sixth time, and calculating, by the network controller, the first delay according to the fourth time, the first time, and the first time interval, and calculating, by the network controller, the second delay according to the sixth time, the fourth time, and the second time interval; and calculating, by the network controller, the round-trip delay ratio according to the first delay and the second delay.

4. The clock synchronization method as claimed in claim 1, further comprising:
storing the round-trip delay ratio in a storage unit of the network controller.

5. The clock synchronization method as claimed in claim 4, further comprising:
transmitting, by the network controller, the round-trip delay ratio to the network switch.

6. The clock synchronization method as claimed in claim 5, further comprising:
calculating a time offset between the network controller and the network switch according to a seventh time at which the network controller transmitting a fourth packet, an eighth time at which the network switch receiving the fourth packet, a ninth time at which the network switch transmitting a fifth packet, a tenth time at which the network controller receiving the fifth packet, and the round-trip delay ratio.

7. The clock synchronization method as claimed in claim 6, wherein the step of locking the first clock based on the time-transfer protocol with the round-trip delay ratio comprises:
obtaining the first clock according to the time offset.

8. The clock synchronization method as claimed in claim 6, further comprising:
periodically transmitting, by the network switch, a synchronization status message to the network controller, wherein the synchronization status message includes the time offset.

9. The clock synchronization method as claimed in claim 8, further comprising:
periodically updating the synchronization status message corresponding to the network switch and stored in the storage unit of the network controller, according to the synchronization status message transmitted by the network switch.

10. The clock synchronization method as claimed in claim 8, further comprising:
determining whether or not at least one module of the network switch breaks down, according to the synchronization status message transmitted by the network switch.

11. The clock synchronization method as claimed in claim 1, wherein the step of computing the round-trip delay ratio between the network controller and the network switch according the first delay, of which the network controller transmitting the packet to the network switch, and the second delay, of which the network switch transmitting the another packet to the network controller comprises:

executing multiple measurements, recording a first plurality of delays, of which the network controller transmitting the packet to the network switch, and recording a second plurality of delays, of which the network switch transmitting the another packet to the network controller;

obtaining the first delay according to the first plurality of delays, of which the network controller transmitting the packet to the network switch;

obtaining the second delay according to the second plurality of delays, of which the network switch transmits the another packet to the network controller; and obtaining the round-trip delay ratio, which is the first delay divided by the second delay.

12. The clock synchronization method as claimed in claim 1, wherein the network controller communicates with the network switch through a third-party network.

13. The clock synchronization method as claimed in claim 1, wherein the centralized mobile network is a software defined networking (SDN), and the network controller is a SDN controller.

14. The clock synchronization method as claimed in claim 1, wherein the network switch is a software defined networking switch.

15. A mobile network system, adapted to a centralized mobile network, comprising:
a network controller; and
a network switch, wherein
the network controller computes a round-trip delay ratio between the network controller and the network switch according to a first delay, of which the network controller transmits a packet to the network switch, and a second delay, of which the network switch transmits another packet to the network controller,
the network switch locks a first clock based on a time-transfer protocol with the round-trip delay ratio, wherein the first clock is synchronized with a master clock of the network controller,
the network switch sets the first clock being locked as a runtime clock of the network switch.

16. The mobile network system as claimed in claim 15, wherein before the network controller computes the round-trip delay ratio between the network controller and the network switch according the first delay, of which the network controller transmits the packet to the network switch, and the second delay, of which the network switch transmits the another packet to the network controller,
the network controller obtains a second clock synchronized with a Grandmaster clock as the master clock of the network controller.

17. The mobile network system as claimed in claim 15, wherein in an operating that the network controller computes the round-trip delay ratio between the network controller and the network switch according the first delay, of which the network controller transmits the packet to the network switch, and the second delay, of which the network switch transmits the another packet to the network controller,
the network controller transmits a first packet to the network switch at a first time, and the network switch records the first time after having received the first packet, wherein when the time at the network switch is recorded as the first time, the network controller is at a second time, and the second time is adding up the first time and the first delay;

the network controller transmits a second packet to the network switch at a third time, wherein a first time interval is the difference between the third time and the second time;

the network switch receives the second packet at a fourth time, the network switch transmits a third packet to the network controller at a fifth time, wherein a second time interval is the difference between the fifth time and the fourth time;

the network controller receives the third packet at a sixth time, the network controller calculates the first delay according to the fourth time, the first time, and the first time interval, and calculates the second delay according to the sixth time, the fourth time, and the second time interval; and the network controller calculates the round-trip delay ratio according to the first delay and the second delay.

18. The mobile network system as claimed in claim 15, wherein the network controller stores the round-trip delay ratio in a storage unit of the network controller.

19. The mobile network system as claimed in claim 18, wherein the network controller transmits the round-trip delay ratio to the network switch.

20. The mobile network system as claimed in claim 19, wherein the network switch calculates a time offset between the network controller and the network switch according to a seventh time at which the network controller transmits a fourth packet, an eighth time at which the network switch receives the fourth packet, a ninth time at which the network switch transmits a fifth packet, a tenth time at which the network controller receives the fifth packet, and the round-trip delay ratio.

21. The mobile network system as claimed in claim 20, wherein in an operation that the network switch locks the first clock based on the time-transfer protocol with the round-trip delay ratio, the network switch obtains the first clock according to the time offset.

22. The mobile network system as claimed in claim 20, wherein the network switch periodically transmits a synchronization status message to the network controller, and the synchronization status message includes the time offset.

23. The mobile network system as claimed in claim 22, wherein the network controller periodically updates the synchronization status message corresponding to the network switch and stored in the storage unit of the network controller according to the synchronization status message transmitted by the network switch.

24. The mobile network system as claimed in claim 22, wherein the network controller determines whether or not at least one module of the network switch breaks down according to the synchronization status message.

25. The mobile network system as claimed in claim 15, wherein in the operating that the network controller computes the round-trip delay ratio between the network controller and the network switch according the first delay, of which the network controller transmits the packet to the network switch, and the second delay, of which the network switch transmits the another packet to the network controller, the network controller executes multiple measurements, records a first plurality of delays, of which the network controller transmits the packet to the network switch, and records a second plurality of delays, of which the network switch transmits the another packet to the network controller, the network controller obtains the first delay according to the first plurality of delays, of which the network controller transmits the packet to the network switch, the network controller obtains the second delay according to the second plurality of delays, of which the network switch transmits the another packet to the network controller, and the network controller obtains the round-trip delay ratio, which is the first delay divided by the second delay.

26. The mobile network system as claimed in claim 15, wherein the network controller communicates with the network switch through a third-party network.

27. The mobile network system as claimed in claim 15, wherein the centralized mobile network is a software defined networking (SDN), and the network controller is a SDN controller.

28. The mobile network system as claimed in claim 15, wherein the network switch is a software defined networking switch.

29. A network controller, adapted to a centralized mobile network, comprising:

a timing module, synchronizing a clock of the network controller with a Grandmaster clock, obtaining the clock synchronized with the Grandmaster clock as a master clock of the network controller; and a clock synchronous calculation module, computing a round-trip delay ratio between the network controller and a network switch according to a first delay, of which the network controller transmits a packet to the network switch, and a second delay, of which the network switch transmits another packet to the network controller.

30. The network controller as claimed in claim 29, further comprising:

a master clock operation module, wherein the master clock operation module transmits a first packet at a first time to the network switch, the network switch records the first time after having received the first packet, wherein when a time at the network switch is recorded as the first time, the network controller is at a second time, and the second time is adding up the first time and the first delay, the clock synchronous calculation module transmits a second packet at a third time to the network switch, wherein a first time interval is the difference between the third time and the second time, wherein the second packet notifies the network switch of receiving the second packet at a fourth time, and then the network switch transmits a third packet at a fifth time to the network controller, wherein a second time interval is the difference between the fifth time and the fourth time, the clock synchronous calculation module receives the third packet at a sixth time, the network controller calculates the first delay according to the fourth time, the first time, and the first time interval, and calculates the second delay according to the sixth time, the fourth time, and the second time interval, the clock synchronous calculation module calculates the round-trip delay ratio according to the first delay and the second delay.

31. The network controller as claimed in claim 29, further comprising:

a storage unit, storing the round-trip delay ratio.

32. The network controller as claimed in claim 31, wherein the clock synchronous calculation module transmits the round-trip delay ratio to the network switch.

33. The network controller as claimed in claim 32, wherein the clock synchronous calculation module further includes a controller agent module, periodically receiving a synchronization status message from the network switch, wherein the synchronization status message includes a time offset.

34. The network controller as claimed in claim 33, wherein the controller agent module periodically updates the synchronization status message corresponding to the network switch and stored in the storage unit of the network controller according to the synchronization status message received from the network switch.

35. The network controller as claimed in claim 33, wherein the clock synchronous calculation module determines whether or not at least one module of the network switch breaks down according to the synchronization status message.

36. The network controller as claimed in claim 29, wherein the clock synchronous calculation module computes the round-trip delay ratio between the network controller and the network switch according to the first delay, of which the network controller transmits the packet to the network switch, and the second delay, of which the network switch transmits the another packet to the network controller,
the clock synchronous calculation module executes multiple measurements, records a first plurality of delays, of which the network controller transmits the packet to the network switch, and records a second plurality of delays, of which the network switch transmits the another packet to the network controller,
the clock synchronous calculation module obtains the first delay according to the first plurality of delays, of which the network controller transmits the packet to the network switch,
the clock synchronous calculation module obtains the second delay according to the second plurality of delays, of which the network switch transmits the another packet to the network controller, and
the clock synchronous calculation module obtains the round-trip delay ratio, which is the first delay divided by the second delay.

37. The network controller as claimed in claim 29, wherein the centralized mobile network is a software defined networking (SDN), and the network controller is a SDN controller.

38. A network switch, adapted to a centralized mobile network, comprising:
a slave clock operation module, receiving a round-trip delay ratio from a network controller in the centralized mobile network, wherein the round-trip delay ratio is computed according to a first delay, of which the network controller transmits a packet to the network switch, and a second delay, of which the network switch transmits another packet to the network controller; and
a timing module, locking a first clock based on a time-transfer protocol with the round-trip delay ratio, wherein the first clock is synchronized with a master clock of the network controller,
wherein the slave clock operation module sets the first clock being locked as a runtime clock of the network switch.

39. The network switch as claimed in claim 38, wherein the network switch further comprises a message proxy module,
wherein the slave clock operation module receives the round-trip delay ratio from a network controller,
the slave clock operation module records a first time after having received a first packet from the network switch, wherein the first packet is transmitted from the network controller, when the time of the network switch is recorded as the first time, the network controller is at a second time, and the second time is adding up the first time and the first delay,
when the message proxy module, at a fourth time, receives a second packet transmitted from the network controller at a third time, the message proxy module transmits a third packet at a fifth time to the network controller, wherein a first time interval is the difference between the third time and the second time, a second time interval is the difference between the fifth time and the fourth time,
after the message proxy module transmits the third packet at the fifth time to the network controller at the fifth time, the message proxy module receives the round-trip delay ratio from the network controller,
wherein the network controller calculates the round-trip delay ratio according to the first delay and the second delay,
wherein the network controller calculates the first delay according to the fourth time, the first time, and the first time interval,
wherein the network controller calculates the second delay according to a sixth time at which the network controller receives the third packet, the fourth time, and the second time interval.

40. The network switch as claimed in claim 38, wherein the slave clock operation module calculates a time offset between the network controller and the network switch according to a seventh time at which the network controller transmits a fourth packet, an eighth time at which the network switch receives the fourth packet, a ninth time at which the network switch transmits a fifth packet, a tenth time at which the network controller receives the fifth packet, and the round-trip delay ratio.

41. The network switch as claimed in claim 40, wherein the timing module of the network switch obtains the first clock according to the time offset.

42. The network switch as claimed in claim 40, further comprising:
a message proxy module, periodically transmitting a synchronization status message to the network controller, wherein the synchronization status message includes the time offset.

43. The network switch as claimed in claim 38, wherein the network switch communicates with the network controller through a third-party network.

44. The network switch as claimed in claim 38, wherein the network switch is a software defined networking switch.

* * * * *